W. W. WYTHES.
Cloth Measurer.
No. 18,313.
Patented Sept. 29, 1857.
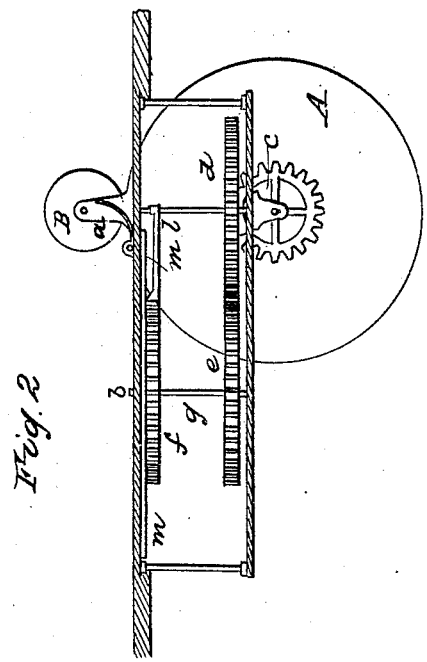
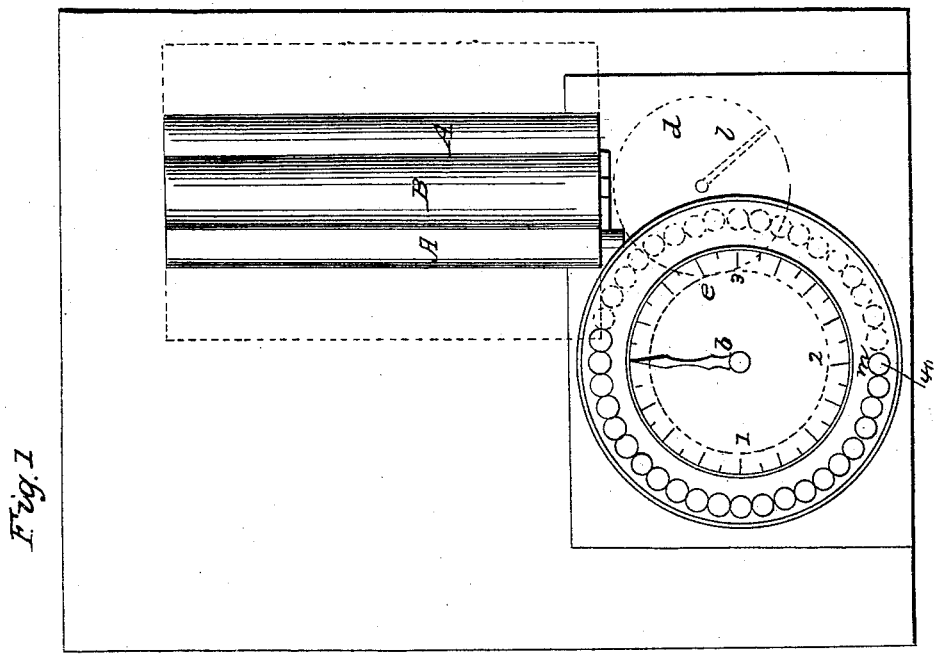

UNITED STATES PATENT OFFICE.

WM. W. WYTHES, OF ST. CLAIR, PENNSYLVANIA.

MACHINE FOR MEASURING CLOTH.

Specification of Letters Patent No. 18,313, dated September 29, 1857.

*To all whom it may concern:*

Be it known that I, WILLIAM W. WYTHES, of St. Clair, Schuylkill county, and State of Pennsylvania, have invented certain new and useful Improvements in Apparatus for Measuring Fabrics; and I do hereby declare the following to be a full, clear, and exact description of the same, reference being had to the accompanying drawing and to the letters of reference marked thereon.

My invention relates to improvements in cloth measuring machinery in which a roller or rollers of a given circumference are used, and my improvements consist in the employment of a measuring roller, and pressure roller, the latter being hung to a spindle in such a manner that the edge of the fabric may be readily introduced between the two rollers and maintained in contact with the measuring roller. As the fabric is drawn along the measuring roller revolves, and by means of apparatus fully described hereafter communicates motion to a pointer as well as to a numbered plate, so that the exact amount of fabric passed between the two rollers can at once be ascertained.

My improvements are arranged and adapted for the use of dry good stores, etc.

In order to enable others skilled in the art to make and use my invention I will now proceed to describe its construction and operation.

On reference to the drawing which forms a part of this specification, Figure 1, is a general plan showing my improved apparatus for measuring fabrics; Fig. 2, an end view of the same looking in the direction of the arrow.

Similar letters refer to similar parts throughout the several views.

D represents a portion of the counter in which is cut an opening for the reception of the measuring apparatus the frame of which consists of the upper plate E and lower plate F connected together by any convenient number of vertical rods G.

A is a roller the circumference of which should measure either a yard or some definite fraction of the same. In this instance it is supposed to measure half a yard. This roller is arranged to turn freely in brackets suspended from the underside of the plate E and to protrude to a slight extent above the surface of the upper plate E. B is a second roller which may be of any suitable diameter, and which turns loosely on a spindle secured to a bracket $f$ the latter being hinged at $h$ to the upper plate E, a spring $a$ being also attached to the same plate for the purpose of pressing down the bracket $f$ and consequently the circumference of the roller B against that of the roller A. On the axis of the latter is a cog wheel $c$ gearing into another cog wheel $d$ on the vertical spindle $i$ which turns in the upper and lower plates. The cog wheel $d$ gears into a similar wheel $e$ on the spindle $j$ which also turns in the upper and lower plate and to the top of which is secured a pointer $b$.

On the spindle $j$ is hung loosely a cog wheel H attached to a circular plate $m$ and this wheel is actuated by an arm $l$ on the spindle $i$. On the top of the plate E is marked an index or dial $p$ so divided as to represent yards, and inches if need be, on the plate $m$ are marked a series of consecutive numbers corresponding to the number of teeth in the wheel $f$, a small orifice being made in the upper plate E, so as to expose the numbers to view, as the plate $m$ turns.

Supposing it be desired to measure forty yards of fabric the operator inserts the end between the rollers A, B which is readily accomplished inasmuch as the spindle of the upper roller has its bearing at one end only, the other end being exposed. The fabric is then drawn between the rollers, and as the upper roller is pressed against the roller A by the spring $a$ it is evident that the lower roller must be turned to an extent commensurate to the length of cloth submitted to its circumference. As the roller A turns the wheel $c$ which has half the number of teeth in the wheel $d$ turns the latter once around to two revolutions of the roller A, the circumference of which we have supposed to measure half a yard consequently at every yard of fabric measured, the arm $l$ will strike one of the teeth of the wheel $f$, and this is continued until No. 40, on the said plate is visible through the orifice in the upper plate E as seen in Fig. 1. At the same time the wheel $d$ transmits through the wheel $c$ a motion to the pointer $b$ which indicates any fractional portion of a yard.

I do not claim exclusively the employment of rollers in connection with an index for measuring fabrics. But What I do claim and desire to secure by Letters Patent is—

1. The arrangement of the measuring roller A with the pressure roller B when the latter is hung loosely on a hinged spindle and acted upon by a spring and when it is exposed at the end for the admission of the fabric substantially in the manner herein set forth.

2. The combination of the shaft $i$, wheel $d$, lever $l$, shaft $j$, wheels $e$ and $h$, numbered plate $m$, index $p$, and pointer $b$ when the whole are arranged substantially in the manner, herein set forth, and for the purpose specified.

In testimony whereof, I have signed my name to this specification before two subscribing witnesses.

WM. W. WYTHES.

Witnesses:
 HENRY HOWSON,
 WILLIAM E. WALTON.